Patented Feb. 17, 1931

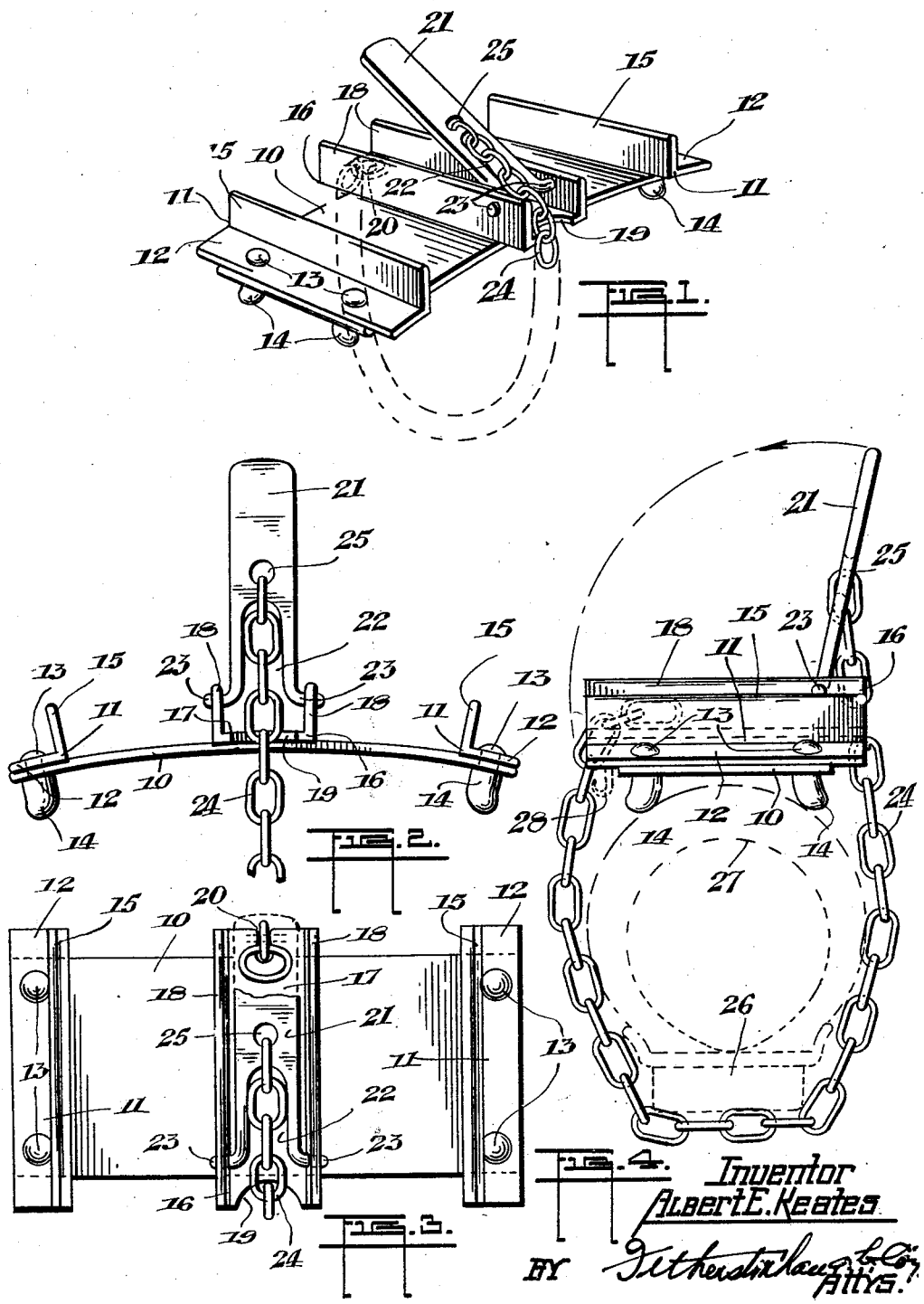

1,792,911

UNITED STATES PATENT OFFICE

ALBERT EDWARD KEATES, OF SOUTH PORCUPINE, ONTARIO, CANADA

TRACTION CLAMP

Application filed July 6, 1929. Serial No. 376,298.

This invention relates to improvements in traction clamps for automobiles, trucks and the like and the object of the invention is to provide an improved and novel form of clamp which may be removably mounted upon the rear wheel of the vehicle for use in providing the necessary traction for getting out of a mud-hole or bad piece of road.

A further object is to provide such a clamp which may be conveniently and quickly attached and removed from the wheel and which is only intended for temporary use when difficulties are encountered such as when one or both wheels are stuck in a mud-hole and skid failing to provide the requisite traction.

A further object is to provide such a clamp which will be of simple and inexpensive construction and which will be very durable.

A further object is to provide a clamp which, when mounted on the wheel, may be securely held thereon so as to maintain its position.

The invention consists of the construction and arrangement of parts, all as hereinafter more particularly described, and illustrated in the accompanying drawings in which, Figure 1 is a perspective view of the improved clamp, an attaching chain forming part thereof being partly shown in broken lines.

Figure 2 is a side elevation of the improved clamp, a locking lever forming part thereof being shown in an intermediate position.

Figure 3 is a top plan view of the improved clamp, the locking lever being shown in the locked position and being partly broken away.

Figure 4 is an end view of the improved clamp in position upon a wheel, the rim and tire of the wheel being indicated in broken lines and a locking lever forming part of the clamp being shown in an intermediate position.

In the drawings like characters of reference indicate corresponding parts in each figure.

The improved clamp consists of a substantially rectangular metal plate 10 which is curved longitudinally to conform to the curvature of the circumference of the tire upon which it is to be used.

Adjacent to each end of the plate 10 is secured an angle bar 11 which bars extend transversely of the plate 10 and one flange 12 thereof is secured to the plate 10 by means of two rivets 13 which rivets are located adjacent to the corners of the plate 10 and the heads of these rivets on the underface of the plate are enlarged to form protuberances 14 extending from the under face of the plate adjacent to each side thereof. The other flanges 15 of the angles 11 are upstanding from the plate 10.

Secured to the plate intermediately of the angles 11 is a channel bar 16 which also extends transversely of the plate and the ends of this channel extend beyond the lateral edges of the plate.

The web 17 of the channel 16 is secured to the plate 10 and the flanges 18 are upstanding from the plate and form spaced apart flanges upstanding from the upper face of the plate. Adjacent to one end thereof the web 17 is formed with a notch 19 and at the other end is formed with a slot 20 the purpose of which will be presently explained.

A lever 21 is formed with a bifurcated end 22 the extremities 23 of the bifurcation being pivotally mounted in the flanges 18 of the channel 16 so that the lever 21 is swingable transversely of the plate about these pivotal points 23. A chain 24 has one end thereof secured to the lever 21 intermediately of the length thereof at 25.

The rim of a vehicle wheel is indicated in broken lines in Figure 4 by the numeral 26 and a tire carried by said rim is indicated in broken lines by the numeral 27.

In using the improved clamp it is only necessary in mounting it upon a wheel to place it against the circumference of the tire 27 and with the lever 21 swung outwardly or away from the channel 16 the chain 24 is passed underneath and around the rim 26 and is drawn upwardly and secured to the opposite end of the channel by inserting one of the links of the chain into the slot 20, as shown clearly in Figure 3. The lever 21 is then swung to its extreme inner position (shown in Figure 3) in which it lies against the web 17 of the channel and between the flanges 18 and when swung into this position it will be evident that the chain 24 is tightened so that the clamp is firmly held in position upon the tire. As the lever 21 is thus swung inwardly the chain 24 passes through the bifurcated end 22 of the lever.

During this tightening operation of the chain it will also be evident that the protuberances 14 on the under side of the plate are pressed into the tire 27 to more securely hold the clamp in position.

The position of the slot 20, it will be apparent, forms means for detachably connecting the free end of the chain to the side of the clamp remote from that at which the lever 21 is pivoted.

If desired, instead of the provision of the slot 20, a hook, indicated in broken lines at 28 in Figure 4, could be used for securing the free end of the chain, in which case one of the links of the chain would be connected to this hook.

The device is intended only for temporary use in getting out of a bad mud-hole or road or portion of a road and as soon as a vehicle is free thereof the clamp would be removed but the construction is such that the attachment and removal may be very conveniently and quickly accomplished.

In the drawings the clamp has been shown as provided with only one chain but for use on large trucks it might be advisable to use two chains in which case a channel 16 and lever 21 with the associated parts would be provided at each end of the clamp instead of merely one such device placed centrally of the clamp as shown.

From the foregoing it will be apparent that the improved clamp provides a device of the class described whereby the objects set forth have been attained.

Various modifications may be made in this invention without departing from the spirit thereof or the scope of the claims, and therefore the exact forms shown are to be taken as illustrative only and not in a limiting sense, and it is desired that only such limitations shall be placed thereon as are disclosed in the prior art or are set forth in the accompanying claims.

What I claim as my invention is:—

1. A traction clamp for a vehicle wheel comprising a metal plate curved longitudinally to conform to the circumference of the wheel, an angle iron extending transversely of the plate adjacent to each end thereof, one flange of each of said angles secured to the upper face of the plate and the other flange upstanding therefrom, a channel iron extending transversely of the plate intermediately of the length thereof, the web of said channel secured to the upper face of the plate and the flanges upstanding therefrom, a lever having a bifurcated end pivotally connected in the upstanding flanges of the channel adjacent to one end of said channel, a chain having one end connected to said lever intermediately of its length, and means for detachably connecting the free end of the chain to the other end of the channel.

2. A traction clamp according to claim 1 in which the plate is rectangular and carries a protuberance on its under face adjacent to each corner thereof.

3. A traction clamp according to claim 1 in which each angle is secured to the plate by a rivet adjacent to each end of the angle, the heads of said rivets forming protuberances on the under face of the plate.

4. A traction clamp for a vehicle wheel comprising in combination, a substantially rectangular metal plate curved longitudinally to conform to the circumference of the wheel, an angle iron extending transversely of the plate and beyond the lateral edges of the plate adjacent to each end thereof and secured thereto by a rivet adjacent to each end of the angle iron, the heads of the rivets forming protuberances on the under side of the plate adapted to contact with the tire of said wheel, one flange of each of said angles secured to the upper face of the plate and the other flange upstanding therefrom, a channel iron extending transversely of the plate intermediately of the length thereof, said channel iron extending beyond the lateral edges of the plate, the web of said channel secured to the upper face of the plate and the flanges upstanding therefrom, a lever having a bifurcated end pivotally connected in the upstanding flanges of the channel adjacent to one end of said channel, a chain having one end connected to said lever intermediately of its length, and means for detachably connecting the free end of the chain to the other end of the channel, which consists in providing one end of the web of the channel with a slot adapted to detachably receive a chain link.

In witness whereof I have hereunto set my hand.

ALBERT EDWARD KEATES.